(12) United States Patent
Khan

(10) Patent No.: US 7,873,900 B2
(45) Date of Patent: Jan. 18, 2011

(54) ORDERING INTERNET VOICE CONTENT ACCORDING TO CONTENT DENSITY AND SEMANTIC MATCHING

(75) Inventor: Emdadur R. Khan, San Jose, CA (US)

(73) Assignee: Inet Spch Property Hldg., Limited Liability Company, Wilmington, DE (US)

( * ) Notice: Subject to any disclaimer, the term of this patent is extended or adjusted under 35 U.S.C. 154(b) by 0 days.

(21) Appl. No.: 11/223,281

(22) Filed: Sep. 9, 2005

(65) Prior Publication Data

US 2006/0010386 A1    Jan. 12, 2006

Related U.S. Application Data

(63) Continuation-in-part of application No. 10/104,430, filed on Mar. 22, 2002, now Pat. No. 7,712,020.

(60) Provisional application No. 60/609,020, filed on Sep. 10, 2004.

(51) Int. Cl.
    *G06F 7/24* (2006.01)
(52) U.S. Cl. .................. 715/234; 715/205; 715/206
(58) Field of Classification Search .............. 379/88.01, 379/88.17; 715/500, 531, 513, 200, 205, 715/234, 206, 501.1; 434/167, 321, 322, 434/362
    See application file for complete search history.

(56) References Cited

U.S. PATENT DOCUMENTS

| 5,774,628 | A | * | 6/1998 | Hemphill | 704/255 |
|---|---|---|---|---|---|
| 5,873,107 | A | * | 2/1999 | Borovoy et al. | 715/234 |
| 5,915,001 | A | | 6/1999 | Uppaluru | |
| 5,953,392 | A | | 9/1999 | Rhie et al. | |
| 6,029,135 | A | * | 2/2000 | Krasle | 704/275 |
| 6,101,473 | A | * | 8/2000 | Scott et al. | 704/275 |
| 6,115,686 | A | | 9/2000 | Chung et al. | |
| 6,157,705 | A | | 12/2000 | Perrone | |
| 6,188,985 | B1 | * | 2/2001 | Thrift et al. | 704/275 |
| 6,282,511 | B1 | * | 8/2001 | Mayer | 704/270 |
| 6,282,512 | B1 | * | 8/2001 | Hemphill | 704/270.1 |
| 6,300,947 | B1 | * | 10/2001 | Kanevsky | 715/866 |
| 6,311,182 | B1 | | 10/2001 | Colbath et al. | |
| 6,418,199 | B1 | * | 7/2002 | Perrone | 379/88.01 |
| 6,574,601 | B1 | | 6/2003 | Brown et al. | |

(Continued)

FOREIGN PATENT DOCUMENTS

WO    03/083641    10/2003

(Continued)

OTHER PUBLICATIONS

Kemble, K., Voice-Enabling Your Web Sites, IBM Developer Works Website, Jun. 30, 2001.

(Continued)

*Primary Examiner*—Cesar B Paula
(74) *Attorney, Agent, or Firm*—Stolowitz Ford Cowger LLP

(57) ABSTRACT

A method of establishing a bi-directional voice communication link with a network access provider, locating a page responsive to a voice command, identifying one or more highlights on the page, transmitting via the bi-directional voice communication link, a voice response corresponding to a aural recitation of the one or more highlights, receiving a voice selection signal identifying a selected one of the one or more highlights, and locating content associated with the selected one of the one or more highlights.

22 Claims, 16 Drawing Sheets

U.S. PATENT DOCUMENTS

| | | | |
|---|---|---|---|
| 6,591,295 B1 | 7/2003 | Diamond et al. | |
| 6,601,066 B1 | 7/2003 | Davis-Hall | |
| 6,604,076 B1 | 8/2003 | Holley et al. | |
| 6,823,311 B2 * | 11/2004 | Tetsumoto | 704/270.1 |
| 6,904,408 B1 | 6/2005 | McCarthy et al. | |
| 7,712,020 B2 | 5/2010 | Khan | |
| 2001/0053987 A1 * | 12/2001 | Kleinschmidt et al. | 705/3 |
| 2003/0182124 A1 | 9/2003 | Khan | |
| 2004/0006476 A1 | 1/2004 | Chiu | |
| 2004/0205614 A1 | 10/2004 | Keswa | |
| 2007/0156761 A1 * | 7/2007 | Smith | 707/104.1 |

OTHER PUBLICATIONS

USPTO; International Search Report PCT/US/2002/018695; Dec. 30, 2002; 2 pages.

Voice XML Forum; version 0.9; pp.1-63, Aug. 17, 1999.

Microsoft Corp., White Paper, "Microsoft Windows NT Server: The Microsoft Windows Telephony Platform: Using TAPI 2.0 and Windows to Create the Next Generation of Computer-Telephony Integration" 1996.

Stolowitz Ford Cowger LLP: Relating Case Listing; Aug. 23, 2010; 1 Page.

* cited by examiner

```
<!-- saved from url=(0022)http://internet.e-mail -->
<!-- saved from url=(0022)http://internet.e-mail -->
<!-- saved from url=(0022)http://internet.e-mail -->
<!-- saved from url=(0022)http://internet.e-mail -->
<!-- saved from url=(0022)http://internet.e-mail -->
<!-- saved from url=(0022)http://internet.e-mail -->
<!-- saved from url=(0022)http://internet.e-mail -->
<html>
<head>
<title>InternetSpeech</title>
<meta http-equiv="Content-Type" content="text/html; charset=iso-8859-1
">
</head>

<body bgcolor="#006699" leftmargin="0" topmargin="0" marginwidth="0" m
arginheight="0">
<table width="800" border="0" cellspacing="0" cellpadding="0">
<tr>
<td colspan="2"><img src="images/logo.gif" width="155" height="85"><im
g src="images/top_left.gif" width="312" height="85"><a href="https://w
ww.internetspeech.com/internetspeech.com/support.htm"><img src="images
/monav_support.gif" width="50" height="85" border="0"></a><a href="abo
utus.htm"><img src="images/monav_aboutus.gif" width="59" height="85" b
order="0"></a><a href="news.htm"><img src="images/monav_news.gif" widt
h="48" height="85" border="0"></a><a href="jobs.htm"><img src="images/
monav_jobs.gif" width="52" height="85" border="0"></a><a href="partner
s.htm"><img src="images/monav_partners.gif" width="51" height="85" bor
der="0"></a><a href="index.htm"><img src="images/monav_home.gif" width
="73" height="85" border="0"></a></td>
</tr>
<tr valign="top">
<td width="155" bgcolor="#ffffff"> <img src="images/spacer.gif" width=
"155" height="1"><br>
<br>
<table border="0" cellspacing="0" cellpadding="3" align="center" width
="140">
<tr align="center">
<td colspan="2"><img src="images/demo_mov.gif" width="110" height="20"
> </td>
</tr>
<tr>
<td colspan="2"><img src="images/see_netecho.gif" width="113" height="
13"><br>
<font size="1" face="Verdana, sans-serif"><a href="http://www.macromed
ia.com/software/flashplayer/">Requires
Macromedia Flash</a></font></td>
</tr>
<!--<tr>
```

FIG. 7A

```
<td><img src="images/arrow.gif" width="14" height="14"></td>
<td><font size="1" face="Verdana, Arial, Helvetica, sans-serif" color=
"#006699">Menu
Options</font></td>
</tr>-->
<tr>
<td><img src="images/arrow.gif" width="14" height="14"></td>
<td><a href="flash/surfing.htm"><font size="1" face="Verdana, Arial, H
elvetica, sans-serif" color="#006699">Web
Browsing </font></a></td>
</tr>
<!--<tr>
<td><img src="images/arrow.gif" width="14" height="14"></td>
<td><font size="1" face="Verdana, Arial, Helvetica, sans-serif" color=
"#006699">E-commerce</font></td>
</tr>
<tr>
<td><img src="images/arrow.gif" width="14" height="14"></td>
<td><font size="1" face="Verdana, Arial, Helvetica, sans-serif" color=
"#006699">Search</font></td>
</tr>-->
<tr>
<td colspan="2"><img src="images/hear_netecho.gif" width="113" height=
"13"><br>
<font size="1" face="Verdana, sans-serif">Requires Audio Program. Clic
k the right mouse button to download.</font></td>
</tr>
<!--<tr>
<td><img src="images/arrow.gif" width="14" height="14"></td>
<td><font size="1" face="Verdana, Arial, Helvetica, sans-serif" color=
"#006699">Menu
Options</font></td>
</tr>-->
<tr>
<td><img src="images/arrow.gif" width="14" height="14"></td>
<td><a href="audio/email.wav"><font size="1" face="Verdana, Arial, Hel
vetica, sans-serif" color="#006699">E-mail</font></a></td>
</tr>
<tr>
<td><img src="images/arrow.gif" width="14" height="14"></td>
<td><a href="audio/stockquote.wav"><font size="1" face="Verdana, Arial
, Helvetica, sans-serif" color="#006699">Stock
Quote </font></a></td>
</tr>
<!--<tr>
<td><img src="images/arrow.gif" width="14" height="14"></td>
<td><font size="1" face="Verdana, Arial, Helvetica, sans-serif" color=
"#006699">E-commerce</font></td>
```

FIG. 7B

```
</tr>
<tr>
<td><img src="images/arrow.gif" width="14" height="14"></td>
<td><font size="1" face="Verdana, Arial, Helvetica, sans-serif" color=
"#006699">Search</font></td>
</tr>-->
</table>

<br>
<br>
<table border="0" cellspacing="0" cellpadding="3" align="center">
<tr>
<td><a href="signup.htm"><img src="images/target_signupnow_white.gif"
width="90" height="56" border="0"></a></td>
</tr>
<tr>
<td><a href="/loginF.htm"><img src="images/target_login_white.gif" wid
th="90" height="56" border="0"></a></td>
</tr>

</table>
</td>
<td width="645"><img src="images/spacer.gif" width="645" height="1"><b
r>
<br>
<br>

<table width="530" border="0" cellspacing="0" cellpadding="0" align="c
enter">
<tr align="center">
<td valign="top" width="33%"><a href="consumers.htm"><img src="images/
consumers.gif" width="155" height="236" border="0"></a><br>

</td>

<td valign="top" width="33%"><a href="business.htm"><img src="images/b
usiness.gif" width="155" height="236" border="0"></a></td>
<td valign="top" width="33%" rowspan="2"><a href="news.htm"><img src="
images/latestnews.gif" width="155" height="40" border="0"></a><br>
<table width="132" border="0" cellspacing="0" cellpadding="2" align="c
enter">
<tr valign="top">
<td>

<p> <a href="tata.pdf"><font size="1" face="Arial, Helvetica, sans-ser
if" color="#FFFFFF">3-11-02–
```

FIG. 7C

TATA Consulting Services - "Tata Consultancy Services to offer netEcho Voice Internet Solution"</font></a></p>

<p> <a href="indiawest.htm"><font size="1" face="Arial, Helvetica, sans-serif" color="#FFFFFF">1-11-02&#150;
INDIAWEST - "InternetSpeech Speeds Web Connections Via Voice"</font></a></p>

<p> <a href="11-29-01.htm"><font size="1" face="Arial, Helvetica, sans-serif" color="#FFFFFF">11-29-01&#150;
Q COMM adds voice Internet service to Qxpress platform</font></a></p>

<p> <a href="11-08-01.htm"><font size="1" face="Arial, Helvetica, sans-serif" color="#FFFFFF">11-08-01&#150;
Internet Speech Signs Agreement With Preferred Voice To Deliver Speech-Driven Email Manager To Telecom Carriers</font></a></p>

</font></a></p>
</td>
</tr>
</table>
</td>
</tr>

<tr align="center">
<td valign="top" width="66%" colspan="2"><br>
<a href="signup.htm"><img src="images/special.gif" width="168" height="100" border="0"></a></td>
</tr>

<tr align="center">
<td valign="top" width="66%" colspan="2"><br>
</td>
</tr>

<tr>
<td valign="top" colspan="3">
<table width="100%" border="0" cellspacing="0" cellpadding="8">

FIG. 7D

```
<tr>
<td><font size="2" face="Verdana, Arial, Helvetica, sans-serif" color=
"#FFFFFF">netECHO™
by InternetSpeech lets people unleash the power of the Internet simply
 with the
sound of their voice. netECHO™ lets users give simple voice comma
nds like
"Yahoo," or "e-mail" to get the Net-based information they want. See h
ow easy
it is to use by checking out our demo.</font></td>
</tr>
</table>
</td>
</tr>
</table>
</td>
</tr>
<tr valign="top">
<td width="155" bgcolor="#FFFFFF" valign="bottom"><img src="images/lef
tbottom.gif" width="155" height="16"></td>
<td width="620" align="center"> <br>
<font face="Verdana" size="1" color="#FFFFFF">Copyright © 2000-20
01 InternetSpeech.
All Rights Reserved. <br>
Designed by</font><font face="Verdana" size="1"> <a href="http://www.i
identity.com"><font color="#ffffff">Interactive
Identity</font></a> <br>
<a href="http://www.internetspeech.com/tos.htm"><font color="#ffffff">
Terms of
Service</font></a> <br>
<a href="http://www.internetspeech.com/privacy.htm"><font color="#ffff
ff">Privacy
Policy</font></a> </font></td>
</tr>
</table>
<br>
<br>
</body>
</html>
```

FIG. 7E

ORDERING INTERNET VOICE CONTENT ACCORDING TO CONTENT DENSITY AND SEMANTIC MATCHING

RELATED APPLICATIONS

This is a continuation-in-part of U.S. patent application Ser. No. 10/104,430 (NOW U.S. Pat. No. 7,712,020 B2), filed on Mar. 22, 2002, and entitled "Transmitting secondary portions of a webpage as a voice response signal in response to a lack of response by a user", and claims priority from U.S. provisional patent application 60/609,020, filed on Sep. 10, 2004, and entitled "Real Microbrowser Using Voice Internet Rendering Technology".

BACKGROUND OF THE INVENTION

1. Field of the Invention

The present invention relates to a method for accessing the Internet, and more particularly to accessing and navigating the Internet through the use of an audio interface, e.g., via standard POTS (plain old telephone service), with a small display screen, e.g., a PDA (personal digital assistant) or cellular telephone screen.

2. Description of the Related Art

The number of Internet access methods has increased with the rapid growth of the Internet. World Wide Web (WWW) "surfing" has likewise increased in popularity. Surfing or "Internet surfing" is a term used by analogy to describe the ease with which a user can use the waves of information flowing around the Internet to find desired or useful information. The term surfing as used in this specification is intended to encompass all of the possible activities a user can participate in using the Internet. Beyond looking up a particular Internet resource or executing a search, surfing as used herein is intended to include playing video games, chatting with other users, composing web pages, reading email, applying for an online mortgage, trading stocks, paying taxes to the Internal Revenue Service, transferring funds via online banking, purchasing concert or airline tickets, etc. Various kinds of web browsers have been developed to facilitate Internet access and allow users to more easily surf the Internet. In a conventional web interface, a web browser (e.g., Netscape Navigator® which is part of Netscape Communicator® produced by Netscape Communications Corporation of Mountain View, Calif.) visually displays the contents of web pages and the user interacts with the browser visually via mouse clicking and keyboard commands. Thus, web surfing using conventional web browsers requires a computer or some other an Internet access appliance such as a WB-2001 WebTV® Plus Receiver produced by Mitsubishi Digital Electronics America, Inc., of Irvine, Calif.

Recently, some web browsers have added a voice based web interface in a desktop environment. In such a system, a user can verbally control the visual web browser and thus surf the Internet. The web data is read to the user by the browser. However, this method of Internet access is not completely controllable by voice commands alone. Users typically must use a mouse or a keyboard to input commands and the browser only reads the parts of the web page selected using the mouse or the keyboard. In other words, existing browsers that do allow some degree of voice control still must rely on the user and visual displays to operate. In addition, these browsers require that the web data to be read aloud must be formatted in a specific way (e.g., the shareware Talker Plug-In written by Matt Pallakoff and produced by MVP Solutions Inc. of Mountain View, Calif., can be used with Netscape Commerce Server and uses files formatted in accordance with a file format identified by the extension "talk".

Some commercially available products (e.g., Dragon Dictate® from Dragon Systems Inc. of Newton, Mass.) can read a web page as displayed on a conventional browser in the standard web data format, however, the particular portion of the page to be read must be selected by the user either via mouse or voice commands. A critical limitation of these systems is that they require the user to visually examine the web data and make a selection before any web data to speech conversion can be made. This limitation also exists when using these systems to surf the web. The user needs to look at the browser and visually identify the desired Uniform Resource Locator (URL), or use a predetermined stored list of URLs, and then select the desired URL by voice commands.

For reasons of increased mobility, it would be more desirable to be able to access and surf the Internet without being required to visually perceive the web data. Furthermore, it would be desirable to allow for "audio-only" access to the Internet such that authors of web pages need not provide web data in specialized formats for audio playback. However, the Internet is primarily a visual medium with information designed to be accessed visually, i.e., by looking at it. Accordingly, the information is displayed with visual access in mind, resulting in use of columns, tables, frames, color, bolded text, various font sizes, variable positioning of text and images, popup windows and so on. During observation, the human brain processes such information and selects the content that the user is interested in reading. When such information is accessed by voice, normally all of the associated text is extracted after filtering out graphics, banners, images, HTML and XML tags, and other unwanted nuances not useful to audio playback. Listening to such content may require much time and thereby lose the interest of the user. Also, selecting part of the text or navigating within a large amount of text displayed for visual access in mind is very difficult.

What would be helpful is an appropriate way of rendering the Internet content such that a relatively small amount of text is produced, quite suitable for audio playback, for facilitating further navigation and selection of content while still accurately representing the source data, i.e., the visual web page.

Additionally, some further important issues relating to accessing the Internet by voice include inter- and intra-page navigation, finding the correct as well as relevant contents on a linked page, and assembling the right contents from a linked page.

The other popular method to access the Internet is to use a personal device like a PDA or a cell phone with small screen. However, the page does not fit on the screen. The user needs to scroll the screen to determine what is on the page. This is a cumbersome, time consuming process that does not always provide a good picture of what is on the website. When a cell phone with screen is used (e.g. in WAP, I-mode and the like), the contents need to be re-written with WML, CHTML or similar languages. This means that contents from the Internet cannot be displayed directly using current methods and hence does not provide a good solution. Besides, when contents are re-written with WML (or similar languages), many small pages need to be created as only small amount of contents can be displayed on a tiny screen. This also results too many choices and options, especially when a page has a lot of content.

SUMMARY OF THE INVENTION

In accordance with the presently claimed invention, viewing of Internet content is facilitated when accessing the Internet using devices with small form factor displays. Visual Internet content is selected and rendered to produce information in formats appropriate for viewing in small form factor displays. (It should be noted that the terms "Internet" and "web" are intended to be interchangeable in that information accessed via the Internet can include information other than that found on the World Wide Web per se.)

In accordance with one embodiment of the presently claimed invention, a method of facilitating access to the Internet involving vocal and aural navigation, selection and rendering of Internet content includes the steps of:

establishing a bi-directional voice communication link between an audio Internet access provider and a user;

receiving, via said bi-directional voice communication link, a voice command signal corresponding to a Internet surfing command;

locating an Internet page corresponding to said Internet surfing command;

identifying one or more highlights associated with said Internet page;

transmitting, via said bi-directional voice communication link, a voice response signal corresponding to an Internet data signal representing a recitation of said one or more highlights;

receiving, via said bi-directional voice communication link, a voice selection signal identifying a selected one of said recited one or more highlights;

locating Internet content related to said selected one of said recited one or more highlights; and separating vertically distinct pluralities of text within said related Internet content; and transmitting said separated pluralities of text separately for serial viewing thereof.

In accordance with another embodiment of the presently claimed invention, a method of accessing the Internet involving vocal and aural navigation, selection and rendering of Internet content includes the steps of:

establishing a bi-directional voice communication link between an audio Internet access provider and a user;

initiating access to an Internet page corresponding to an Internet surfing command by transmitting, via said bi-directional voice communication link, a voice command signal corresponding to said Internet surfing command;

receiving, via said bi-directional voice communication link, a voice response signal corresponding to an Internet data signal representing a recitation of one or more highlights identified as being associated with said Internet page;

initiating access to Internet content related to a selected one of said recited one or more highlights by transmitting, via said bi-directional voice communication link, a voice selection signal identifying said selected one of said recited one or more highlights; and receiving an image signal corresponding to a selected portion of said related Internet content in which vertically distinct pluralities of text within said related Internet content are separated for serial viewing thereof.

BRIEF DESCRIPTION OF THE DRAWINGS

FIGS. 7A-7E depict the source code for the web page of FIG. 6.

DETAILED DESCRIPTION OF THE INVENTION

The present invention is preferably embodied as a computer program developed using an object oriented language that allows the modeling of complex systems with modular objects to create abstractions that are representative of real world, physical objects and their interrelationships. However, it will be readily understood by one of ordinary skill in the art that the subject invention can be implemented in many different ways using a wide range of programming techniques as well as general purpose hardware systems or dedicated controllers.

The present invention is used in accessing the Internet using only voice and audio instead of conventional visual inputs and displays. A POTS (plain old telephone service) can be used to access the Internet by calling an "audio" ISP (Internet service provider). An audio ISP includes a conventional data ISP that is buffered by an apparatus capable of performing a selective translation function using artificial intelligence methods. This selective translation function can be performed by an apparatus called an Intelligent Agent (IA) as described in more detail below. The IA translates Internet data into spoken language as well as translate spoken data and commands into Internet web surfing commands.

An audio ISP uses a standard telephone (POTS, digital or analog cellular telephone, PCS telephone, satellite telephone, etc.) instead of a modem, telephone line and a direct connection to a conventional data ISP. An audio ISP uses TAPI (telephony application programming interface) or a similar protocol to connect a standard telephone to a computer or other Internet appliance. The IA takes information from the caller in the form of voice commands, accesses the Internet, retrieves the desired information, and reads it back to the caller using voice. Using voice input and output signals only, the caller can surf the net by interacting with the IA. The IA eliminates the need for a conventional visual web browser.

Figure 1:
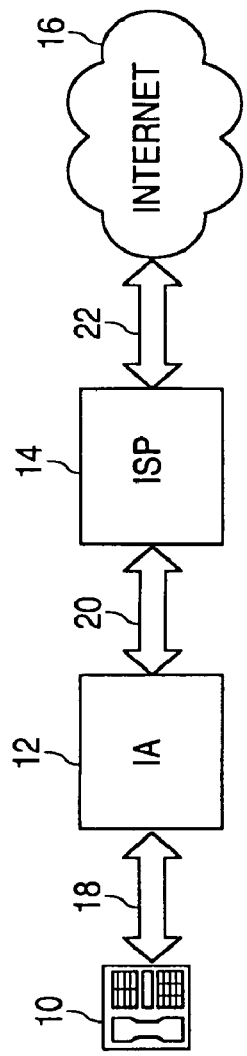
FIG. 1 depicts a high level block diagram of an example of a system for accessing the Internet using a standard telephone.

Turning now to FIG. 1, an intelligent agent (IA) 12 allows a user, via a standard telephone 10, to communicate with the Internet 16 through a conventional ISP 14. The IA 12 receives voice input signals 18 from the user via the telephone 10. One of ordinary skill in the art would recognize that any number of audio-only-based bi-directional communication systems could be used in place of the standard telephone 10 including digital or analog cellular telephones, PCS telephones, satellite telephones, two-way radios, etc. The IA 12 initiates an Internet session by providing a signal 20 to a conventional ISP 14. The IA 12 can connect to the conventional ISP 14 using any number of well known methods including the use of dial-up modems, cable modems, Digital Subscriber Lines, Integrated Services Digital Networks, T1/T3 lines, Asynchronous Transfer Mode lines, local area network. high speed bus, etc. The conventional ISP generates an output signal 22 to access the Internet 16 as is known in the art. A web page from the Internet 16 is sent to the IA 12 via the conventional ISP 14. The IA 12 interprets the contents of the web page and determines which parts of the web page that need to be converted from text to speech (TTS), text table to speech, graphics to speech (GTS), or graphics to text to speech (GTTTS using Optical Character Recognition (OCR) and then TTS). The IA 12 then converts the selected parts of the page to speech and sends a signal 18 containing the speech to the user via the telephone 10. The user via the telephone 10 can continue to request other URLs. In addition, the user can interact with web pages such as search engines to locate a desired URL. The IA 12 repeats the process of getting the new web page and sending back an audio-only version to the user via the telephone 10 using, for example, a standard telephone line.

The IA 12 is configurable to provide a user-selectable level of detail in the audio-only version of a retrieved web page. Thus, for example, a web page containing a list of matching URLs generated by a search engine in response to a query could be read to the user in complete detail or in summary form.

Figure 2:
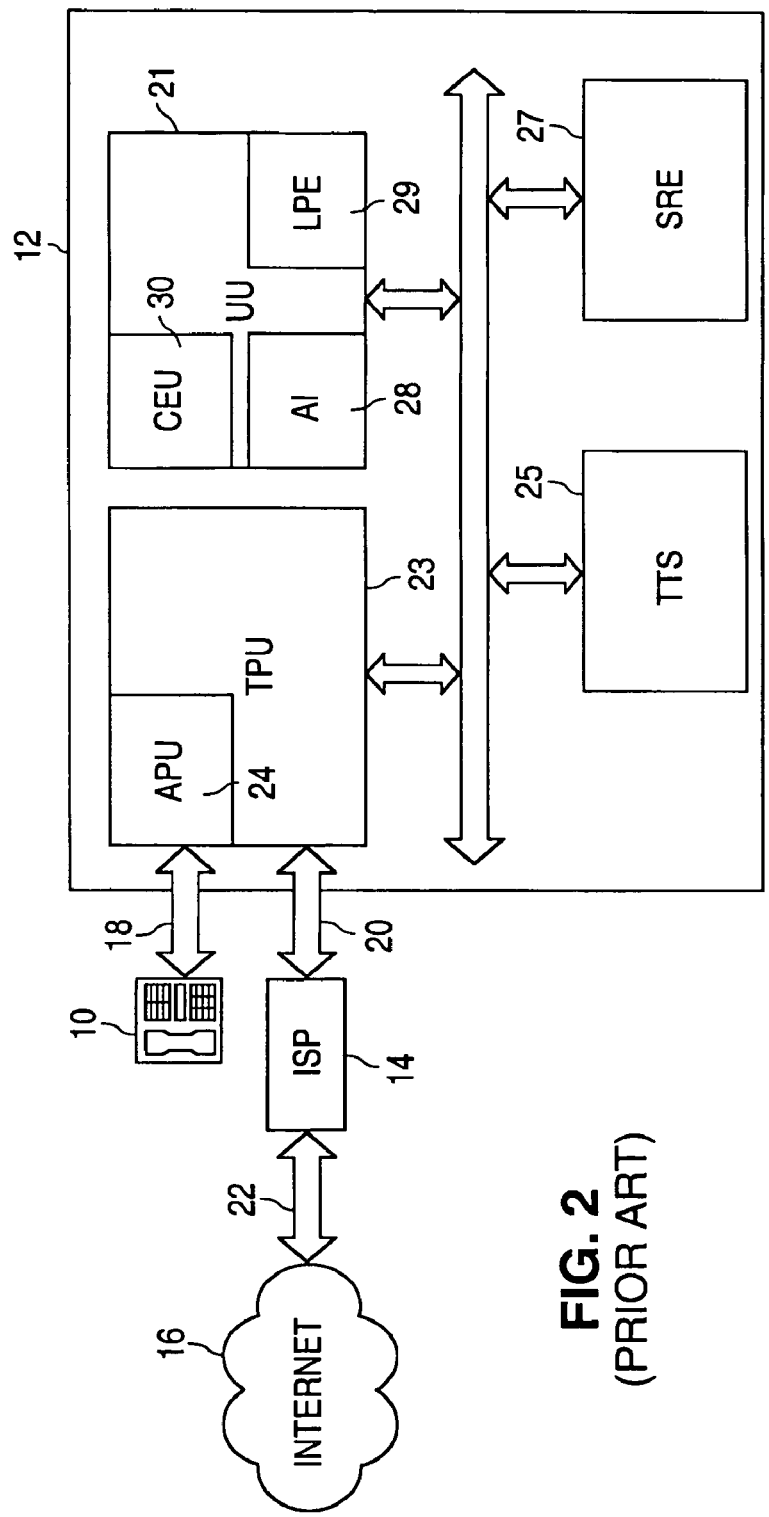
FIG. 2 depicts a block diagram of an example of an intelligent agent (IA) component of the system depicted in FIG. 1.

Referring now to FIG. 2, the IA 12 of FIG. 1 is described. The IA 12 provides an intelligent interface between the user on the telephone 10 and the Internet 16. In one embodiment, the IA 12 includes a speech recognition engine (SRE) 27, a text to speech conversion engine (TTS) 25, an understanding unit (UU) 21 that understands both the contents of the web page and the user's spoken voice, and a transaction processing unit (TPU) 23. While these components of the IA 12 are depicted as individual hardware circuits coupled together via a single bus, one of ordinary skill in the art would understand that many different hardware architectures could be used and likewise, the entire IA 12 (or parts of it) could be implemented as software operable to run on a general purpose computer or even is another data processing device.

The TPU 23 communicates with the user via the telephone 10 and the Internet 16 using signals 18 and 20. The users' telephone calls are answered by the answer phone unit (APU) 24 which is preferably embodied as a telephone card or modem and is part of the TPU 23. The TPU 23 communicates with the user via the telephone 10 using, for example, the TAPI standard, a protocol developed by Microsoft Corporation of Redmond, Wash., that is used in connecting a telephone with a computer over a standard telephone line. In one embodiment, the TPU 23 communicates with the Internet 16 via the conventional data ISP 14 using: a modem and a telephone line; a cable modem and a cable line; or an Ethernet connection as is known in the art. Thus, the IA 12 integrates an audio ISP with conventional data ISP using a modem or Ethernet connection. This form of Intelligent Agent operates as a true "voice browser" in that ordinary Internet content can be accessed and rendered into audio form for reading back to the user, as opposed to a conventional "voice browser" that can only read back content which has been originally written or rewritten in some form of voice-enabled language, such as Voice Extensible Markup Language (VXML).

The UU 21 is preferably implemented as a programmed computer processor including the normally associated memory and interface ports as is well known in the art. The UU 21 is operative to determine what part of a web page is graphics, what part is a dynamic advertisement, what part is an interactive program, which text is a link to a URL, etc. and makes decisions accordingly. The UU 21 is also equipped with means to understand a user's commands. The UU 21 uses a language processing engine (LPE) 29 to interpret multiple words received from the user. The UU 21 uses an artificial intelligence (AI) unit 28 that includes one or more expert systems, probabilistic reasoning systems, neural networks, fuzzy logic systems, genetic algorithm systems, and combinations of these systems and other systems based on other AI technologies (e.g., soft computing systems). In order to understand the users' commands, the UU 21 uses the SRE 27 to convert users' commands to text. Before sending the web page text to the user via the telephone 10, the UU 21 selectively converts text to speech using the TTS unit 25. The UU 21 allows the user to interact with Internet web pages by creating a complete audio representation of the web pages. Thus, if a web page includes a dynamic program such as a Java program to calculate a mortgage payment for example, the UU 21 would execute the program within the IA 12 and describe the display that would have been generated by a conventional visual browser. The IA 12 can also use the UU 21 to identify and interpret audio formatted data, including audio hypertext mark up language (HTML) tags.

The UU 21 also includes a client emulation unit (CEU) 30 that allows the UU 21 to execute web client type programs such as Java and Java script programs that would normally execute on a user's client computer. The CEU 30 can spawn a virtual machine (e.g., a Microsoft Windows NT window), execute the client program to generate the associated displays, and pass the display data to the UU 21 to be translated and relayed to the user as described above. In this way, users are able to execute and interact with web pages that include executable programs.

Figure 3:
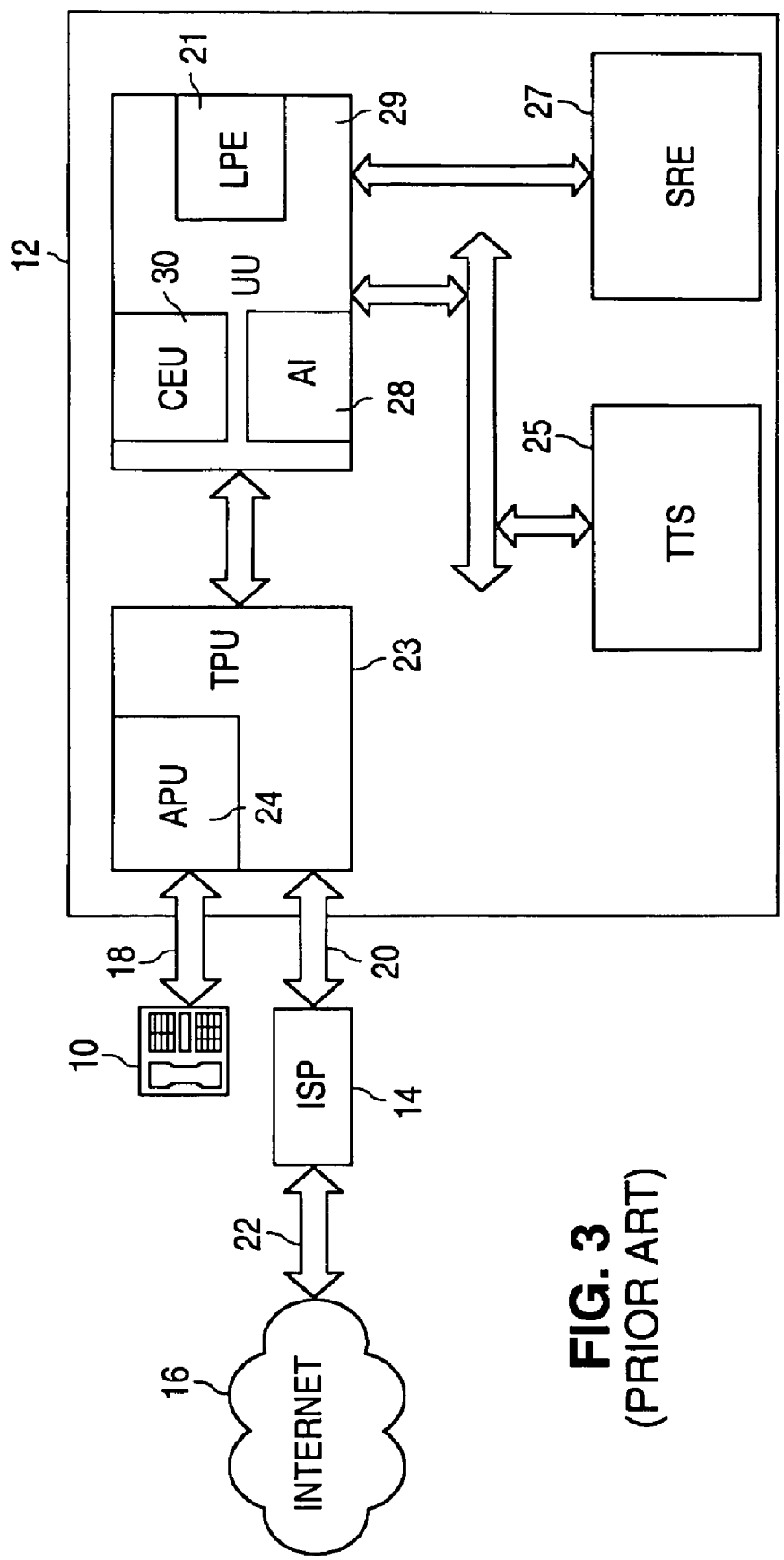
FIG. 3 depicts a block diagram of a second example embodiment of an intelligent agent (IA) component of the system depicted in FIG. 1 in accordance with the present invention.

FIG. 3 depicts an alternate architecture for the IA 12. The individual functional components of the IA 12 are identical to those described in FIG. 2 and as such the components are identified using the same reference numerals. Such embodiment of FIG. 3 provides an arrangement for the functional components that can allow for a more optimized operation.

Figure 4:
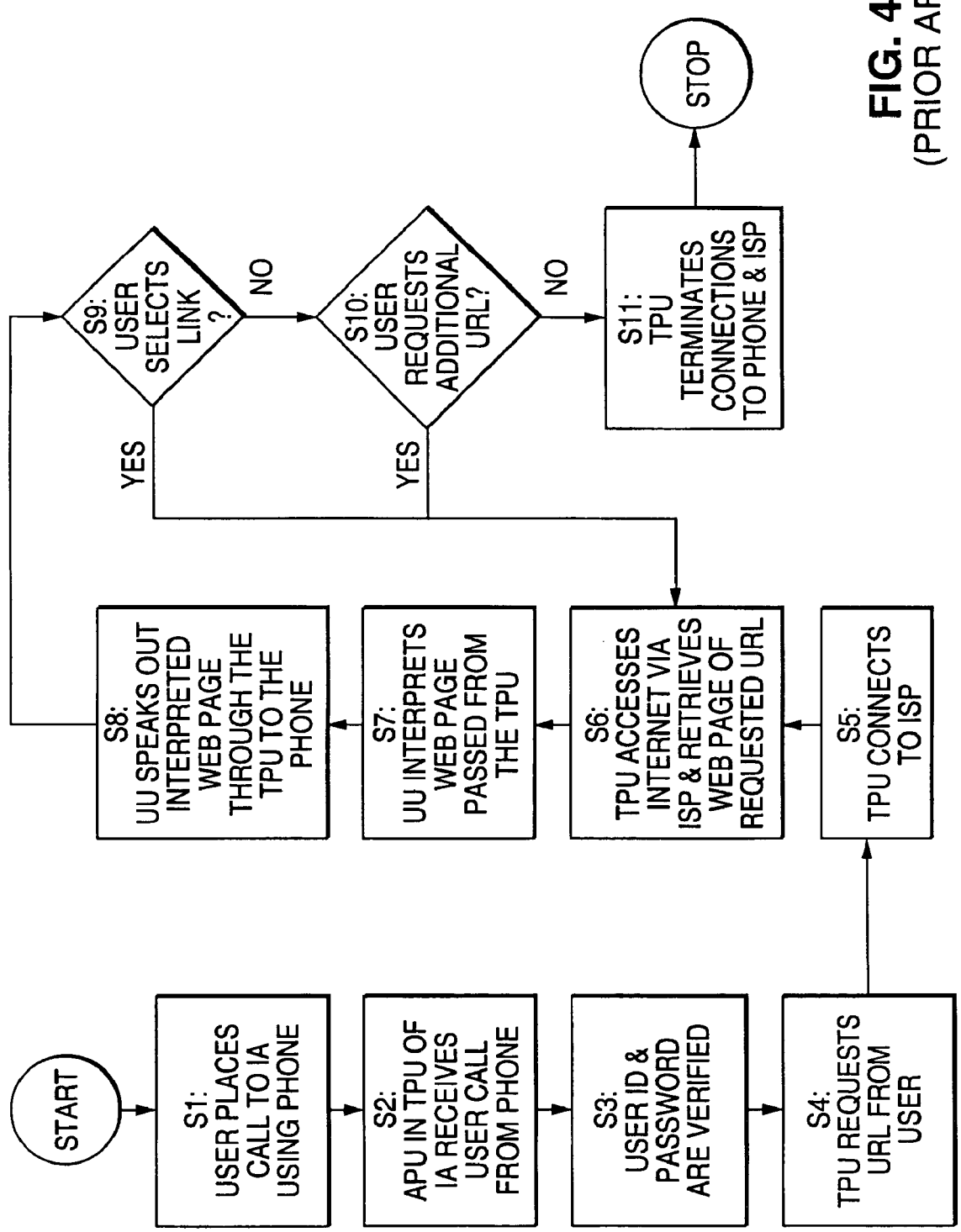
FIG. 4 depicts an example embodiment of a method of accessing the Internet using a standard telephone in accordance with the present invention.
Figure 5A:
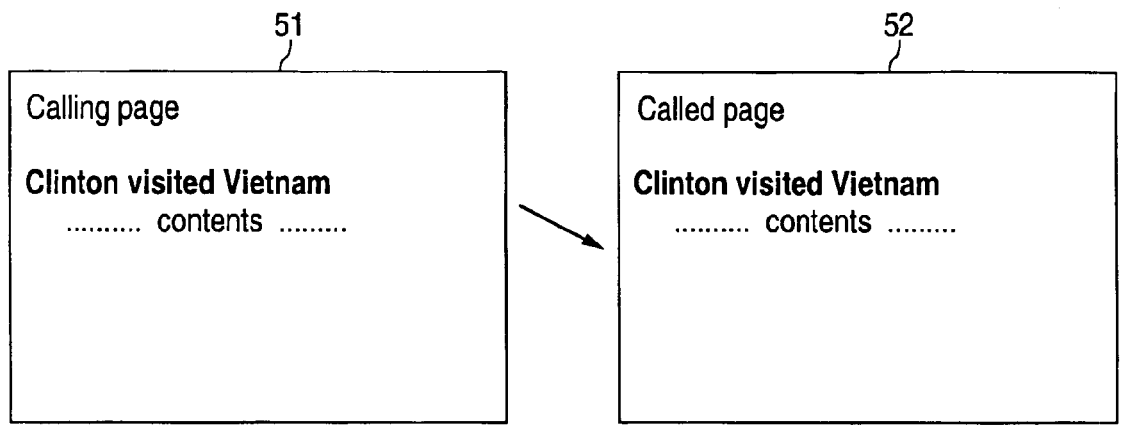
FIGS. 5A-5D depict various levels of difficulty when rendering Internet content from a linked page.
Figure 5B:
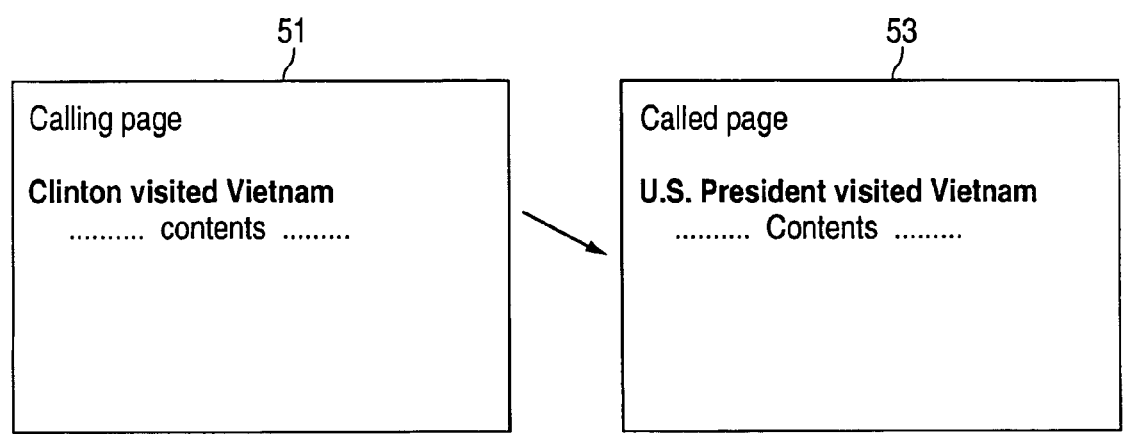
Figure 5C:
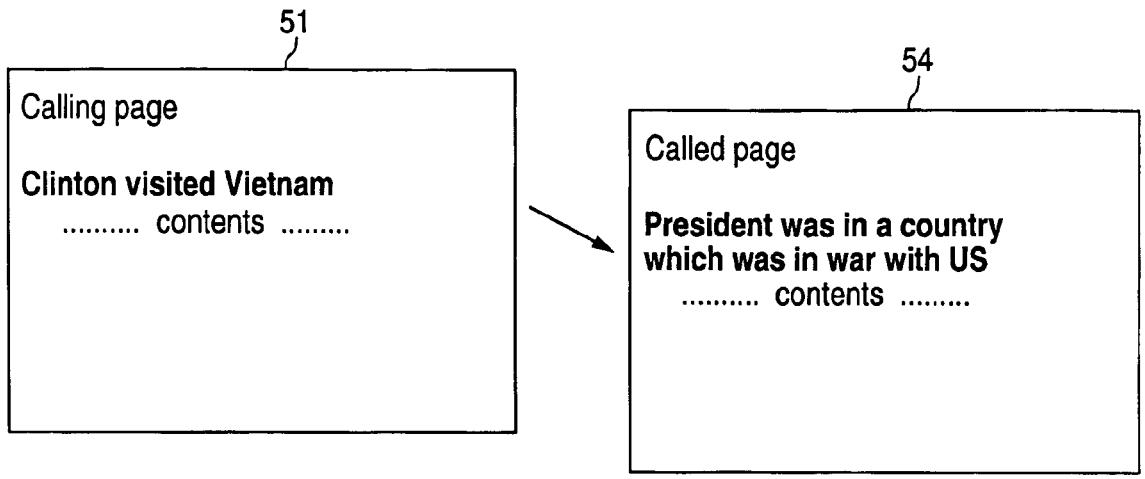
Figure 5D:
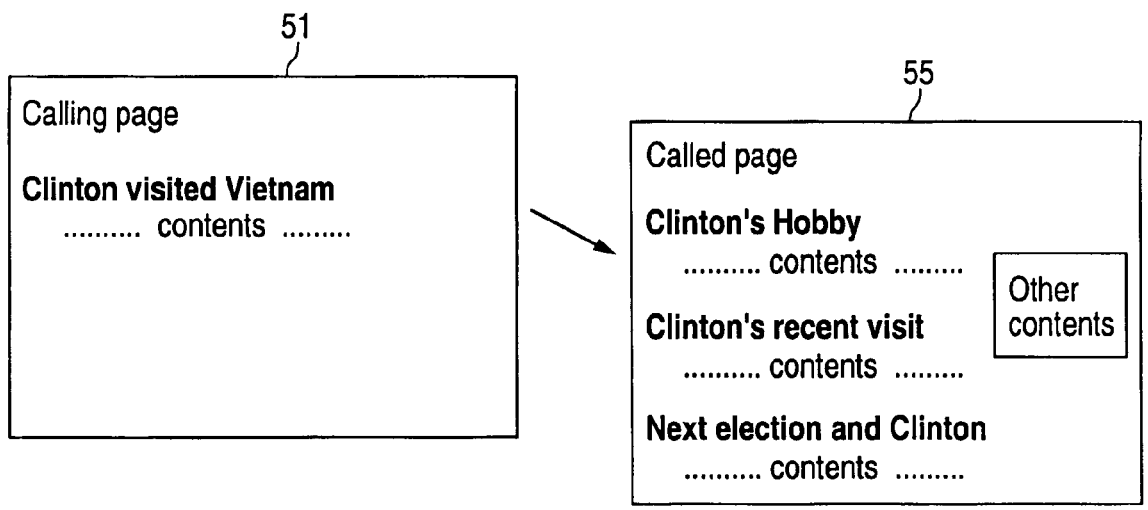

Turning now to FIG. 4, a flow chart depicting an example audio-only web browsing transaction using the systems illustrated in FIGS. 1, 2 and 3 is described. In steps S1 and S2, a user's telephone call to the IA 12 is answered by the APU 24 within the TPU 23 as depicted in FIG. 2. After checking the user's identification and password in step S3, the TPU 23 asks the user for a URL to access in step S4. A connection to the conventional ISP 14 is then created in step S5 using the TPU 23. After accessing the Internet and receiving the web page in step S6, the web page is interpreted by the UU 21 in step S7. In step S8, the UU 21 speaks out the appropriate text of the web page to the user via the telephone 10. Processing steps S6 through S8 are repeated until the user discontinues selecting links to new URLs in decision step S9 and stops requesting additional URLs in decision step S10. At that point, the TPU 23 terminates the connections to both the telephone 10 and the Internet 16.

In one embodiment, the IA 12 is implemented in software and executed on a server computer. It is important to note that a user does not need a conventional visual browser because the IA 12 effectively provides an audio ISP. However, the audio ISP can be implemented using a conventional visual web browser in conjunction with the IA 12. Additionally, it should be understood that the IA 12 and ISP 14 can reside on the same computer. Alternatively, an audio ISP can use other means of accessing and retrieving web pages such as the Win32 Internet (Winlnet) Application Programming Interface (API) as developed by Microsoft Corporation. One of ordinary skill in the art would further understand that the IA 12 can also be used to access, manage, compose, and send email. In other words, a user can send or receive email, as well as perform other tasks such as searching on the Internet, using voice only working through the IA 12. Thus, a user can surf the web and can exploit all of the capabilities of the Internet, simply through human voice commands and computer generated-voice responses instead of using a visual browser running on a computer or other Internet appliance.

Rendering information that is visual in nature to an audio format is difficult. For information displayed visually, it is the brain of the user that quickly selects and correctly processes the information. Visual processing is inherently parallel, while audio processing is inherently serial. Thus, the content to be provided in audio form needs to be precise and short. It is not sufficient to simply parse the content from HTML or XML to text and then to audio. Determining and filtering unnecessary text is important for audio rendering. Different web sites uses different styles in displaying the visual information. To develop rules that will handle all possible cases of visual display style and still provide good audio content is very challenging.

Referring to FIGS. 5A-5D, rendering relevant information from a linked page is also difficult, especially when the link label in the calling page does not match the label in the called page. For example, if the calling page 51 has a link label of "Clinton visited Vietnam" and the called page 52 has a label of "Clinton visited Vietnam", then the problem is simple inasmuch as a good match exists between the labels in the calling page 51 and called page 52. However, if the called page 52 has a label like "US President visited Vietnam", then it is more difficult to match the labels and, hence, the contents of the linked pages 51, 53. A more difficult case is when the called page 54 has a label of "President was in a country which was in war with US" since in this case there are no matching words. An even more difficult case would be where the called page 55 has two or more labels with similar meaning.

Providing a voice portal that can convey a reasonable representation of Internet content presents many challenges. Navigation and selection by voice can be attempted in many ways. If a voice menu based approach is used, the number of menus and steps to follow will generally be so large as to be impractical. If the content is searched in response to questions by the user, the number of possible questions would also be so large as to be impractical. Plus, many problems would exist concerning voice recognition (due to the large vocabulary needed) and a need for an intelligent database that can be reliably accessed for retrieving the correct information.

For purposes of the present invention, various algorithms are used by the Intelligent Agent IA to do rendering, navigation and selection of the desired content. The subject algorithms use the information already available on the visual web pages, including elements such as columns, tables, frames, colors, bolded text, font sizes, positioning and popup windows. As discussed in more detail below, "page highlights" that provide important information or highlights of the accessed page corresponding to the URL are used. A small number of such highlights (e.g., three) are read at a time, with users given the opportunity to select any one of the highlights or topics at a time. Once a highlight has been selected, the content associated with that highlight is read to the user. An assumption behind this is that the related content exists and is somewhere in either the current page or a linked page perhaps a level or few down.

One example is where the related content is on the same page as the selected highlight. In that case, the Intelligent Agent IA reads the selected content from the current page (discussed in more detail below).

Another example is where the selected highlight is a link. In that case, the Intelligent Agent IA accesses the linked page to find the relevant content and read it to the user (discussed in more detail below).

Still another example is where multiple related content exists on the linked page. In that case, the Intelligent Agent IA provides for fine tuning the selection, after which the selected content is read to the user (discussed in more detail below).

Yet another example is where multiple related content exists on the linked page, but none of it can be easily identified and selected. In that case, the Intelligent Agent IA either provides such related content as next level highlights or reads them to the user in some logical order based on content density or semantic matching (discussed in more detail below).

Page highlights are determined using techniques similar to those that one would use to visually find a highlight on a page by looking at the page contents. Thus, it is based on page elements such as (without limitation) font sizes, links, colors, sizes of the content, language understanding, and so on. The Intelligent Agent IA examines the HTML and/or XML tags and such page elements and determines the highlights. Further techniques are used to determine which highlights are more important and hence should be read to the user first. One example of a basic algorithm to determine highlights is as follows:

If the content is with largest font size (largest font on the current page but not part of a banner)

Then
{
this is highlight #1.
If this content is a link, then related content on the linked page will be read when this highlight is selected
Else
Associated content on the current page will be read when this highlight is selected. In this case association is determined by next paragraph or table or frame etc. that is directly related to this highlight.
If there are more than one content with largest size and none of them are links, then priority is assigned to the highlight with largest content associated with it. If they are all links, the one with highest # of words has the highest priority. If they are mixture of links and non-links, then priority is assigned to the links.
}
else
If the content is flashing but not part of a banner
Then
{
this is highlight #2.
If there are more than one flashing content, the priority is decided based on the same algorithm outlined above for the largest font size.
}
else
{
Use second largest font, followed by third largest font, etc., to determine the priority. When font sizes become same, then priority is determined using same algorithm as for the largest font size except that a content with Bold has the higher priority.
}

It will be understood that variations of these techniques are possible. For example, flashing content may be treated with the highest instead of second highest priority. The goal is to use a technique that closely represents how a human user would select highlights when examining a visual web site.

Also, if desired, banner advertisements can be retained as options for selection by the user.

Figure 6:
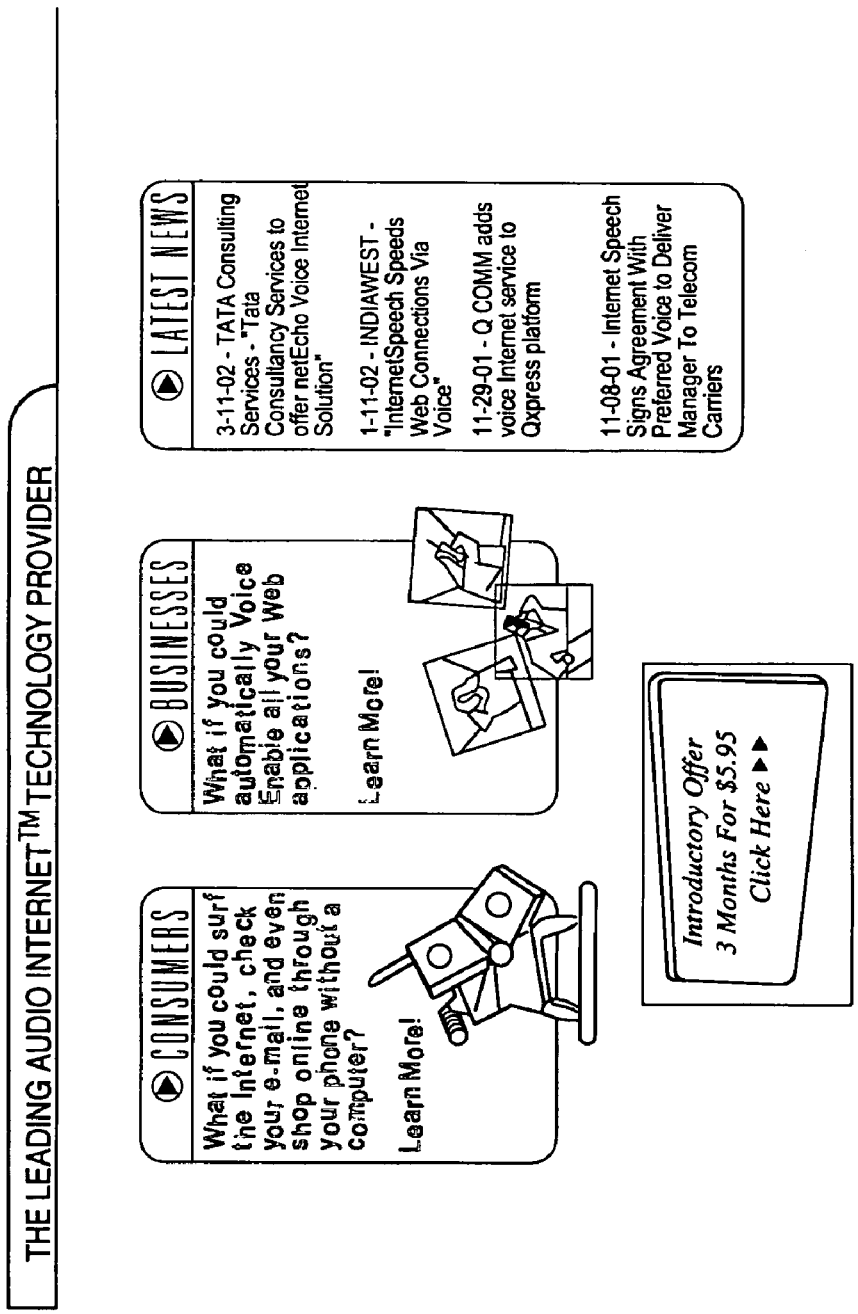
FIG. 6 depicts an example of a web page.

Referring to FIG. 6, one more specific example of how highlights can be selected in accordance with the presently claimed invention will be discussed, with reference also to FIGS. 7A-7E which contain the source code for the web page as depicted in FIG. 6. The contents labeled "Consumers", "Businesses" and "Latest News" have the largest font size. But these contents are GIF (Graphics Interchange Format) images, not pure text. Also, the contents associated with "Consumer" are part of a GIF image and are not pure text. Hence, this would not generally be selected as a highlight in normal operation. However, if the user wished to use it as a highlight, it can be made to do so. The link labeled "11-08-01 Internet Speech Signs . . . " has the largest number of words and hence is selected as highlight #1. The next highlight (highlight #2) is "3-11-02-TATA Consulting Services . . . " is a link with the second largest number of words. The third highlight is "11-29-01-Q COMM . . . " is a link with nine words. Instead of using the number of words, the number of characters might be more appropriate in some cases, such as where the content is in Chinese, Japanese or Korean.

The next set of highlights can be selected using a technique similar to that as outlined above. Clearly, the highlight identification techniques discussed herein provide important information in a logical manner that a user would normally use when observing a web page visually. Also provided are good navigation tools to access the next page for obtaining only relevant contents from the linked page (discussed in more detail below). Thus, such techniques "render" information from a visual web page into an audio format that is concise and pleasant for listening by the user.

Apart from using highlights, rendering can also be done by providing key words of a page and then using queries. In general, queries should include one or more of the key words. Queries can be a simple sentence or just a word or a few words. Using the word matching and content and link density analyses discussed in more detail below with the key words, appropriate related content can be selected.

The user may already know a few key words associated with a particular web site and may simply try using such key words without listening to any of the key words read from the page. Alternatively, a simple key word may not be found in a page but a user still can say other word(s) as part of the query, and if there is a match the relevant content can then be read out. If some confusion arises (e.g., multiple matches), the Intelligent Agent IA will ask the user more questions to minimize ambiguity and improve selection of the relevant content. If there is no match for the word(s) asked, semantic analysis and language understanding can be used to find and select relevant contents. For example, the user may say "U.S President" but the page may not contain this phrase or term. Instead the page may have the name of one U.S President (e.g., Clinton) and so the language understanding unit will match this with the query and will read back the content associated with this. If the page contains "Clinton" in multiple non-associated paragraphs, e.g., not next to each other or under separate topics, the Intelligent Agent IA will read the first sentence of each topic and ask the user which content he or she would like to hear.

Depending on the level of complexity, related contents are selected based on a variety of approaches that include: parsing and word matching; analysis of content density; and analysis of link density. For parsing and word matching, attempts are made to match words in the label of the highlight with words in the label of the highlights on the linked page. After a match is found, the content associated with the match is selected. Association can be based (without limitation) on frames, tables, paragraphs, etc. If multiple associations are found, then the most important association is selected first. Importance of association can be determined based upon semantic meaning, language understanding and processing, or simpler elements such as paragraph sizes. To save on the amount of computation needed, matching for all words in a sentence is not usually necessary. The relevant contents can often be found after matching a few words, since the page may have only one instance of the selected words in the desired sequence. If similar sequences of words are found more than once, contents can be read to the user based upon the priority as determined by the size of the paragraphs associated with such matches.

If no word matches are found, then the page is tested for content density and link density. If the content density is high, as compared to the link density, a key body portion of the content is identified and selected. Key body portions can be identified (without limitation) by length of contents, font sizes, colors, tables, frames, etc. Conversely, if the link density is high, as compared to the content density, then the highlight of the page is determined and presented so that user can link down to the next level to find the desired content.

Content density is determined by counting the total number of words (or letters or characters as appropriate, e.g., for Chinese or Japanese language pages), without considering links, divided by the total number of words (or letters or characters) while considering both links and non-links.

Link density is determined by either counting the total number of words (or letters or characters as appropriate, e.g., for Chinese or Japanese language pages) in the links, or counting the total number of links and dividing by the total number of words (or letters or characters) while considering both links and non-links.

If after performing the foregoing good content is still not found, more computation intensive approaches, e.g., semantic analysis, language processing or understanding, can be used to find more relevant content. These approaches are based upon semantic analysis, language processing and understanding using context information. Learning algorithms can be used to improve the semantic analysis and language understanding. With much improved language understanding, it will also be possible to make a summary of long paragraphs or contents. In such cases the key concept or statements in the first (and sometimes the second) and last paragraphs are noted. Contents with similar meaning (either explicit or implicit) are gathered and duplications are removed resulting in a summary. This is just an example. Other language understanding techniques based upon "summary" computations can also be used.

In the event that related content is still not found, and the page is not a link rich page (i.e., the density of links within the page is low), the entire section or page can then simply be read to the user.

Referring to FIGS. 8A-8D, an example of the methodology used to perform the rendering of Internet content as discussed above can be charted as shown and explained as follows.

Following the initial accessing 81 of a web page, a determination 82 is made as to whether any highlights exist on that page. As discussed above, page elements such as text font sizes, links, colors, amount of text, and so on are examined to make this determination 82. If it is determined that no highlights exist, all of the contents of the page are recited 83.

On the other hand, if it is determined that highlights do exist, selected highlights are recited 84. For example, if a number of highlights exist, the first three or four highlights can be recited to solicit feedback or commands from the user as to which highlight is to be selected for further processing. If no highlight is selected 85, then additional highlights are recited 84 for further selection opportunities for the user. When a highlight is selected 85, then a determination 86 is made as to whether the related content associated with the selected highlight is on the current web page. If not, then the linked page identified by the selected highlight is accessed 87. Following this, and also if the related content is on the current web page, a determination 88 is then made as to whether there are one or more word matches between the selected highlight and any portion of the related content.

If there is such a word match, then a determination 92 (FIG. 8B) is made as to whether or not there are multiple word matches. If not, then the selected contents are recited in order 95. On the other hand, if there are multiple word matches, then a determination 93 is made as to the size of the contents associated with each word match. Once the respective sizes have been determined, the matches are ordered 94 according to the sizes of their associated contents. Following that, the selected contents are recited in order 95.

Figure 8A:
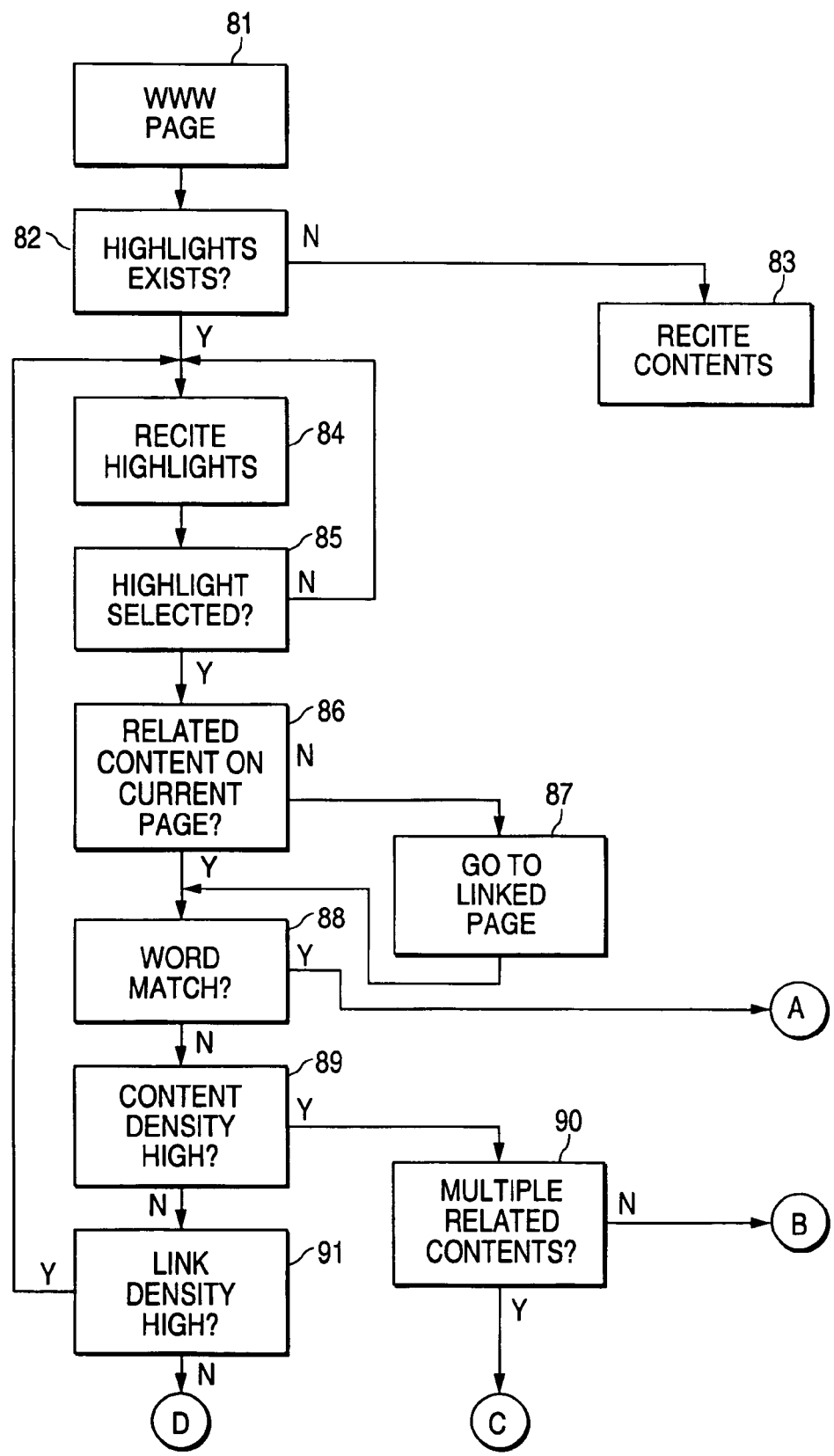
FIGS. 8A-8D depict a flowchart for a method in accordance with one embodiment of the present invention.
Figure 8B:
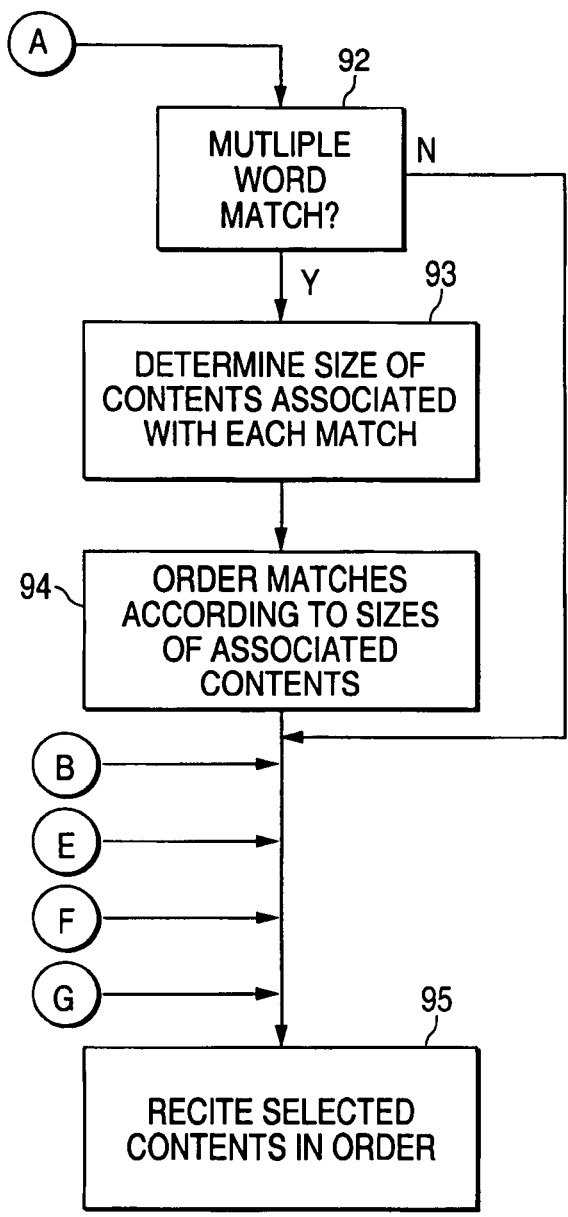
Figure 8C:
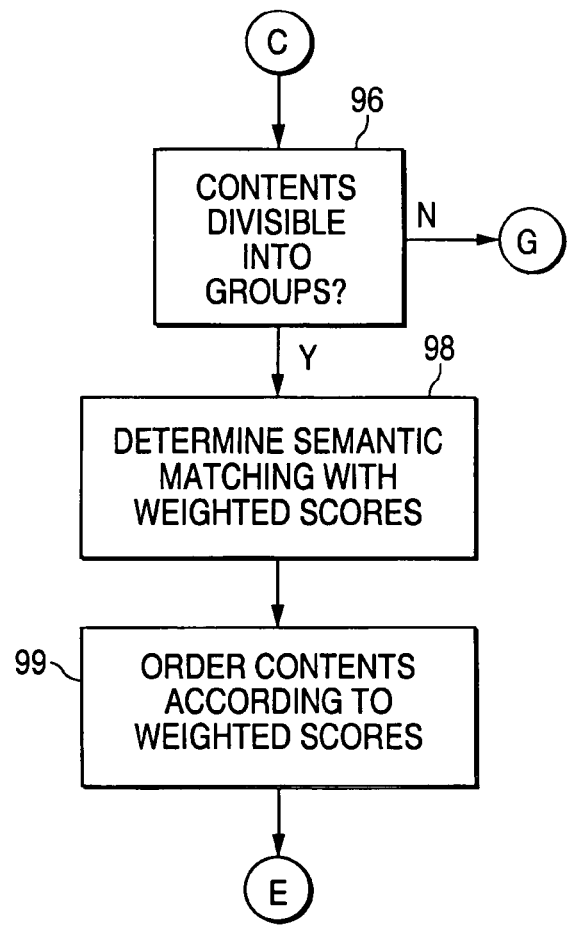
Figure 8D:
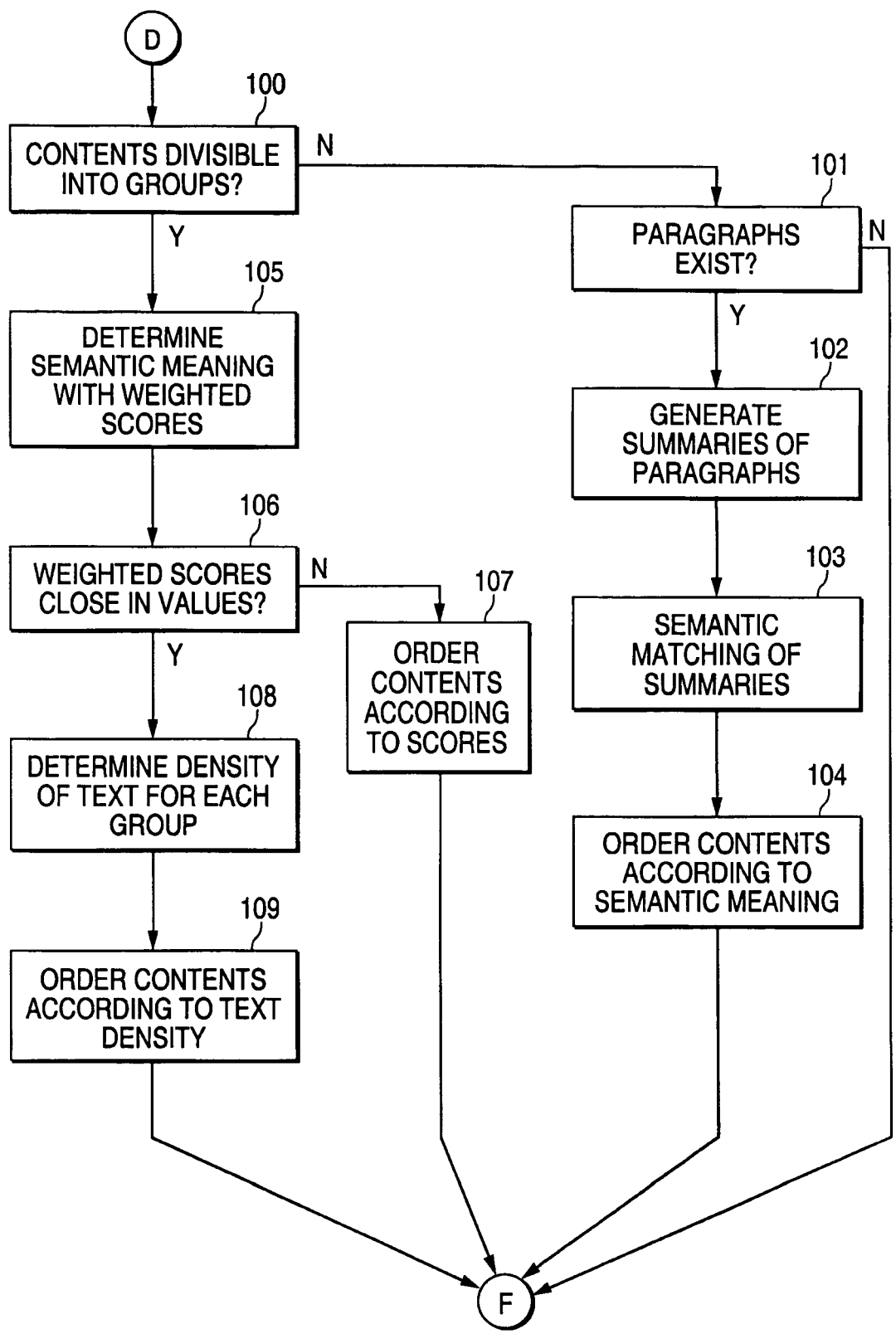

However, if the word match determination 88 (FIG. 8A) determines that there are no word matches, then a determination 89 is made as to whether the content density is high. In other words, it is determined whether a significant amount of content exists that is related to the originally selected highlight. If the content density is high, then a determination 90 is made as to whether there are multiple related contents. If not, then the selected contents are recited in order 95 (FIG. 8B). However, if it is determined that there are multiple related contents, then a determination 96 (FIG. 8C) is made as to whether the contents are divisible into groups. If they are not divisible, then the selected contents are recited in order 95. However, if the contents are divisible into groups, then a determination 98 is made about the semantic matching with weighted scores assigned according to the amount and degree of such matching. Following that, the contents are ordered 99 according to the weighted scores, following which the selected contents are recited in order 95.

If, however, the determination 89 (FIG. 8A) as to the content density finds that the content density is not high, then a determination 91 is made as to the link density. If the number of links is significant on the accessed web page, then highlights from such web page are recited 84 for soliciting a highlight selection from the user. Following that, the foregoing steps are repeated as appropriate.

If, however, it is determined that the link density is not high, then a determination 100 (FIG. 8D) is made as to whether the contents are divisible into groups. If the contents are not divisible into groups, then a determination 101 is made as to whether paragraphs exist in the content. If no paragraphs do exist, then the selected contents are recited in order 95 (FIG. 8B).

However, if paragraphs do exist, then summaries of the paragraphs are generated 102, following which a semantic matching 103 is performed upon the summaries. Then, according to the semantic meaning of the contents, such contents are placed into an appropriate order 104, following which the selected contents are then recited in order 95.

If, however, the original determination 100 finds that the contents are divisible into groups, then a determination 105 is made as to the semantic meaning, with appropriate weighted scores assigned. Following that, a determination 106 is made as to whether such weighted scores are close in their respective values. If the values are not close, then the contents are ordered 107 according to their weighted scores, and the selected contents are recited in order 95.

If, however, the weighted scores are close in values, then a determination 108 is made as to the density of the text for each group. Following that, the contents are ordered 109 according to their respective text densities. Finally, those selected contents are then recited in order 95.

Based upon the foregoing discussion, it will be recognized that all of the approaches and techniques discussed above are also applicable for languages other than English. Further, the selected contents can be converted into other languages in real time. For example, a web site written in English can be accessed by saying the name of the web site in Japanese and then listening to the selected content in Japanese by converting the English content into Japanese in real time.

A MicroBrowser is a browser that can access the Internet and either display any website content on a small screen or play it in audio or both at the same time. When displayed on a small screen, the content fits the screen and can be scrolled automatically. The user does not need to scroll the screen to figure out what is on the website.

This new MicroBrowser would be a very good practical simple device to provide Internet in a most convenient way, thus, beneficially allowing any cell phone, PDA, Micro Reader or similar devices to more easily access the Internet.

The MicroBrowser technology is based on the subject invention of the aforementioned U.S. patent application Ser. No. 10/104,430 ("the rendering patent") that renders contents from any existing website into precise, short, easily navigable and meaningful content when displayed on a tiny screen or is listened to in audio. This is achieved by utilizing an Intelligent Software Agent (IA), that can dynamically translate (render) existing web pages that are written in HTML, XML, WML or similar languages. The IA renders visual web information into meaningful text or audio. Rendering is achieved by using Page Highlights (using a method to find and speak the key contents on a page), finding right as well as relevant contents on a linked page, assembling the right contents from a linked page, and providing easy navigation. These key steps are done using the information available in the visual web page itself and proper algorithms to use all such information including text contents, color, font size, links, paragraph, and amount of text. Artificial Intelligence techniques are used in this automated rendering process. This is similar to how a human brain renders from a visual page by selecting the information of interest and then reading it.

It is very important that the user can very easily interact with the IA and access to the desired web contents. The IA ensures this by properly manipulating the information extracted from the web page. Key features for seamless navigation include Page Highlights, Traversing Links, Repeat Page, Back Page, Next Paragraph, and Skip Paragraph, etc. Contents are usually "rendered" into columns. This means that a column is chosen, displayed and scrolled. A column can easily fit on a small screen as its width is short enough to easily view on the screen. If a column is too wide, its width can automatically be adjusted to fit on the screen and scroll automatically. It is to be noted that a column of text may also include links. Besides, instead of a column, a set of highlights might be displayed if it is the home page or a link rich page to help rendering and navigation more convenient.

Figure 9:
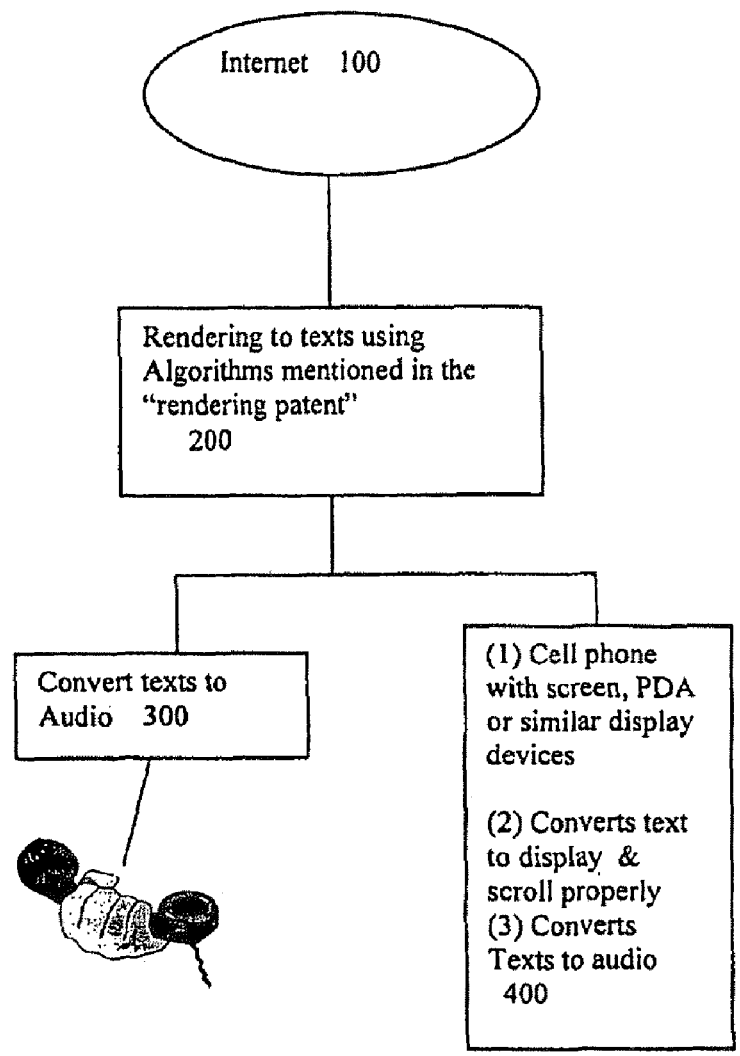
FIG. 9 depicts a flowchart for a method in accordance with another embodiment of the present invention.

As mentioned above, finding only relevant contents from the desired page significantly ease the navigation. For example, the "Opera" browser, which is a visual small browser and similar to a MicroBrowser to some extent, displays a whole page linearly, like a column at a time but starting from the top of the page and ending at the bottom of the page. Thus a user needs to go through the whole page. But the presently claimed invention avoids the need for linear display of all contents by automatically selecting the right and relevant contents from the page and then displaying that as a column at a time. This is depicted in FIG. 9.

Figure 10:
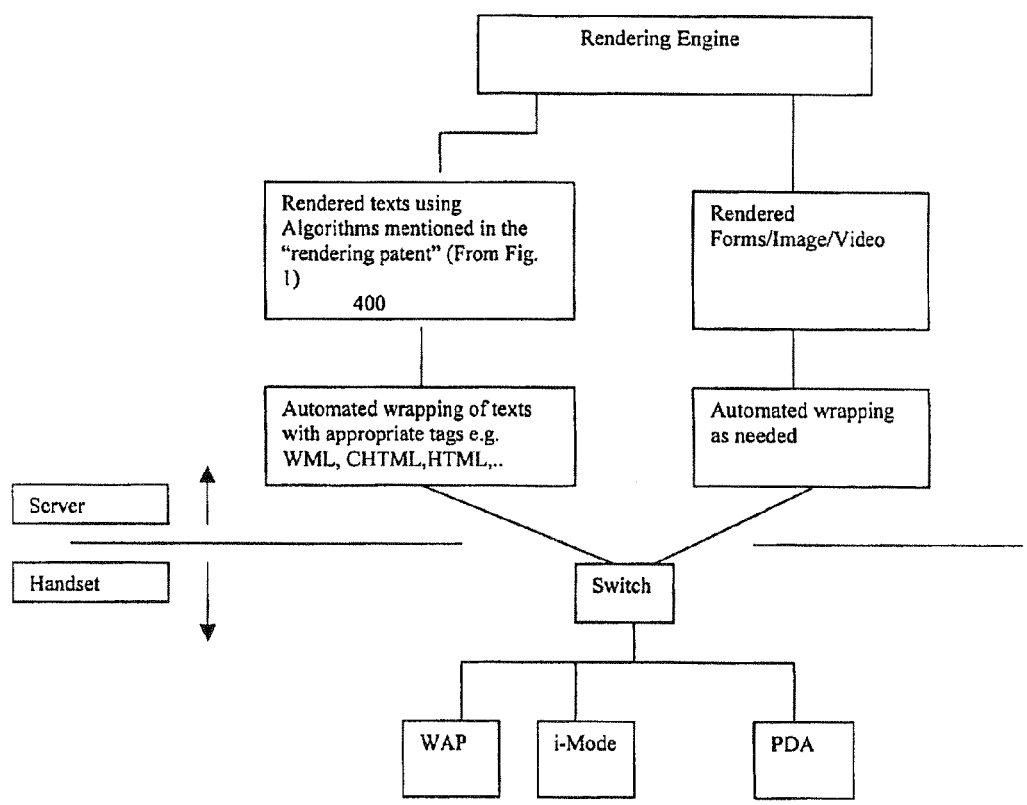
FIG. 10 depicts a flowchart for a method in accordance with still another embodiment of the present invention.

Referring to FIG. 10, the rendered text needs some additional steps for display on any display device. This is basically needed to easily fit to various standards e.g. WAP (WML), I-Mode (CHTML), PDA (HTML), etc., including simply basic wrapping of pure text. Such wrapping is simple and can be automatically done reliably. These operations are preferably done at the server side so that any device can display the rendered text. These rendered contents, which are usually done a column at a time, are made to fit the whole screen and hence can be viewed very comfortably. The contents are scrolled automatically with a speed that user can choose so that it can be viewed or heard at ease. If a rendered content is not a column but a whole page, it is still wrapped in a manner to display on the full screen like a column and scrolled automatically so that user can still view (or hear) at ease.

For ease of rendering, the "forms" and image/video are rendered separately, e.g., a user can press a key to choose available "forms" on a page. If so, only the forms will be provided as Highlights and user would be able to choose and fill a particular form. The same applies for images on the same page. The user can choose either to view the rendered text or view just the image/video. While text and images can be combined at the same time, this would be similar to displaying the whole page on a tiny screen. Forms, images and video can be rendered easily using the corresponding uniquely identifiable tags.

It is important to note that to really provide all Internet contents, Language Translation is essential as 80% of the Internet content today is in English. So, people from many non-English speaking countries are left out from major parts of the Internet. Here, again, automation plays an important role. The IA may include a language translation engine that dynamically translates web contents from one language into another in real time. Thus, when a Chinese speaking person asks to surf an English website in Chinese, the Intelligent Agent would access the English website, extract the content of the website and translate it on the fly in Chinese and read or display it back to the user in Chinese.

While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense. Further, even though only certain embodiments have been described in detail, those having ordinary skill in the art will certainly understand that many modifications are possible without departing from the teachings thereof. All such modifications are intended to be encompassed within the following claims.

What is claimed is:

1. A method, comprising:
    establishing a bi-directional voice communication link with an audio network access provider;
    locating a network page responsive to a voice command signal corresponding to a network command using an intelligent agent configured to read a network content originally written for a visual web browser;
    identifying one or more highlights associated with the network page in the network content originally written for the visual web browser comprising identifying related content on the network page and locating the related content;
    transmitting, via the bi-directional voice communication link, a voice response signal corresponding to a network data signal representing a recitation of only the one or more highlights;
    receiving, via the bi-directional voice communication link, a voice selection signal identifying a selected one of the one or more highlights in response to the voice response signal corresponding to the network data signal representing the recitation of only the one or more highlights;
    locating network content originally written for the visual web browser identified by the selected one of the recited one or more highlights responsive to the voice selection signal;
    separating vertically distinct pluralities of text within the identified network content originally written for the visual web browser responsive to the voice selection signal;
    determining a content density associated with the related content;
    determining multiple related contents responsive to the content density;
    dividing the multiple related contents into one or more subgroups responsive to the content density;
    determining semantic matching between at least two subgroups;
    assigning weighted scores to the at least two subgroups responsive to the determining; and
    ordering the at least two subgroups according to the assigning.

2. The method of accessing the network of claim 1, where the content originally written for the visual web browser includes content written using an hypertext markup language (HTML) page.

3. The method of claim 1 where identifying the one or more highlights includes:
    identifying related content for each highlight on the network page;
    locating the related content for each highlight;
    determining an extent of the related content for each highlight; and
    prioritizing the one or more highlights for serially ordered recitation according to the extent of the related content of each highlight.

4. The method of claim 1 where identifying the one or more highlights includes determining one or more words associated with the one or more highlights on the network page that match one or more words on a related network page and ordering the one or more highlights for serially ordered recitation according to the size of contents associated with the one or more words associated with the one or more highlights.

5. The method of claim 4 comprising:
    determining multiple words on the related network page that match at least one word on the network page; and
    ordering the multiple words according to an associated content size.

6. The method of claim 1 wherein the recitation is free of any items added to the content available on the network page.

7. A method, comprising:
    establishing a bi-directional voice communication link with an audio network access provider;
    locating a network page responsive to a voice command signal corresponding to a network command using an intelligent agent configured to read a network content originally written for a visual web browser;
    identifying one or more highlights associated with the network page in the network content originally written for the visual web browser comprising identifying related content on the network page and locating the related content;

transmitting, via the bi-directional voice communication link, a voice response signal corresponding to a network data signal representing a recitation of only the one or more highlights;

receiving, via the bi-directional voice communication link, a voice selection signal identifying a selected one of the one or more highlights in response to the voice response signal corresponding to the network data signal representing the recitation of only the one or more highlights;

locating network content originally written for the visual web browser identified by the selected one of the recited one or more highlights responsive to the voice selection signal;

separating vertically distinct pluralities of text within the identified network content originally written for the visual web browser responsive to the voice selection signal;

determining a content density associated with the related content;

determining multiple related contents responsive to the content density;

dividing the multiple related contents into one or more subgroups responsive to the content density;

identifying one or more paragraphs associated with the one or more subgroups;

generating summaries of the one or more paragraphs;

determining semantic matching between at least two paragraphs; and ordering the related content according to the semantic matching between the at least two paragraphs.

8. The method of accessing the network of claim 7, where the content originally written for the visual web browser includes content written using an hypertext markup language (HTML) page.

9. The method of claim 7 where receiving the voice response signal includes determining one or more words associated with the one or more highlights on the network page that match one or more words on a related network page and ordering the one or more highlights for serially ordered recitation according to the size of contents associated with the one or more words.

10. The method of claim 9 comprising:
determining multiple words on the related network page that match one word on the network page; and
ordering the multiple words according to an associated content size.

11. A method comprising:
establishing a bi-directional voice communication link with an audio Internet access provider;
initiating access to an Internet page corresponding to an Internet surfing command by transmitting, via the bi-directional voice communication link using an intelligent agent for reading an Internet content originally written for a visual web browser from the Internet page, a voice command signal corresponding to the Internet surfing command;
receiving, via the bi-directional voice communication link, a voice response signal corresponding to an Internet data signal representing a recitation of one or more highlights identified as being associated with the Internet content originally written for the visual web browser;
initiating access to Internet content originally written for the visual web browser related to a selected one of the recited one or more highlights by transmitting, via the bi-directional voice communication link, a voice selection signal identifying the selected one of the one or more highlights responsive to the voice response signal;
determining whether one or more words associated with the one or more highlights on the Internet page match one or more words on a related Internet page;
identifying related content on the Internet page;
locating the related content;
determining a content density associated with the related content;
determining multiple related contents responsive to the content density;
dividing the multiple related contents into one or more subgroups responsive to the content density;
determining semantic matching between at least two of the subgroups;
assigning weighted scores to the at least two subgroups responsive to the determining; and
ordering the at least two subgroups according to the assigning.

12. A method comprising:
establishing a bi-directional voice communication link with an audio Internet access provider;
initiating access to an Internet page corresponding to an Internet surfing command by transmitting, via the bi-directional voice communication link using an intelligent agent for reading an Internet content originally written for a visual web browser from the Internet page, a voice command signal corresponding to the Internet surfing command;
receiving, via the bi-directional voice communication link, a voice response signal corresponding to an Internet data signal representing a recitation of one or more highlights identified as being associated with the Internet content originally written for the visual web browser;
initiating access to Internet content originally written for the visual web browser related to a selected one of the recited one or more highlights by transmitting, via the bi-directional voice communication link, a voice selection signal identifying the selected one of the one or more highlights responsive to the voice response signal;
determining whether one or more words associated with the one or more highlights on the Internet page match one or more words on a related Internet page;
identifying related content on the Internet page;
locating the related content;
determining a content density associated with the related content;
determining multiple related contents responsive to the content density;
dividing the multiple related contents into one or more subgroups responsive to the content density;
identifying one or more paragraphs associated with the one or more subgroups;
generating summaries of the one or more paragraphs;
determining semantic matching between at least two paragraphs; and
ordering the related content according to the semantic matching between the at least two paragraphs.

13. A computer readable medium having computer-executable instructions stored thereon that, if executed by a processor, cause the processor to perform a method comprising:
establishing a bi-directional voice communication link with an audio network access provider responsive to a voice command corresponding to a network surfing command;

locating a network page corresponding to the network surfing command using an intelligent agent configured to read network content originally written for a visual web browser;

identifying one or more highlights associated with the network page in the network content originally written for the visual web browser comprising identifying related content on the network page and locating the related content;

transmitting, via the bi-directional voice communication link, a voice response signal corresponding to a network data signal representing a recitation of the one or more highlights;

receiving, via the bi-directional voice communication link, a voice selection signal identifying a selected one of the one or more highlights in response to the voice response signal corresponding to the network data signal representing the recitation of the one or more highlights;

locating network content originally written for the visual web browser selected one of the recited one or more highlights responsive to the voice selection signal;

determining a content density associated with the related content;

determining multiple related contents responsive to the content density;

dividing the multiple related contents into one or more subgroups responsive to the content density;

determining semantic matching between at least two subgroups;

assigning weighted scores to the at least two subgroups responsive to the determining; and ordering the at least two subgroups according to the assigning.

14. The computer readable medium of claim 13 where identifying the one or more highlights includes determining one or more words associated with the one or more highlights on the network page that match one or more words on a related network page and ordering the one or more highlights for serially ordered recitation according to the size of contents associated with the one or more words.

15. The computer readable medium of claim 14 comprising:

determining multiple words on the related network page that match at least one word on the network page; and ordering the multiple words according to an associated content size.

16. A computer readable medium having computer-executable instructions stored thereon that, if executed by a processor, cause the processor to perform a method comprising:

establishing a bi-directional voice communication link with an audio a network access provider responsive to a voice command corresponding to a network surfing command;

locating a network page corresponding to the network surfing command using an intelligent agent configured to read a network content originally written for a visual web browser;

identifying one or more highlights associated with the network page in the network content originally written for the visual web browser comprising identifying related content on the network page and locating the related content;

transmitting, via the bi-directional voice communication link, a voice response signal corresponding to a network data signal representing a recitation of the one or more highlights;

receiving, via the bi-directional voice communication link, a voice selection signal identifying a selected one of the one or more highlights in response to the voice response signal corresponding to the network data signal representing the recitation of the one or more highlights;

locating network content originally written for the visual web browser selected one of the recited one or more highlights responsive to the voice selection signal;

determining a content density associated with the related content;

determining multiple related contents responsive to the content density;

dividing the multiple related contents into one or more subgroups responsive to the content density;

identifying one or more paragraphs associated with the one or more subgroups;

generating summaries of the one or more paragraphs;

determining semantic matching between at least two paragraphs; and ordering the related content according to the semantic matching between the at least two paragraphs.

17. An apparatus, comprising:

means for establishing a voice link with an access provider;

means for locating a page comprising content written for a visual web browser responsive to a voice command;

means for identifying one or more highlights on the page;

means for locating content related to the one or more highlights on the page;

means for transmitting, via the voice link, a voice response corresponding to an aural recitation of the one or more highlights;

means for receiving, via the voice link, a voice selection indicating selection of one of the one or more highlights responsive to the voice response;

means for locating additional content written for the visual web browser responsive to the selected one of the one more or more highlights;

means for determining a content density associated with the additional content;

means for determining multiple related content responsive to the content density;

means for determining semantic matching between at least two subgroups of the multiple related content responsive to the content density;

means for assigning weighted scores to the at least two subgroups responsive to the semantic matching; and means for ordering the at least two subgroups according to the weighted scores.

18. An apparatus, comprising:

means for establishing a voice link with an access provider;

means for locating a page comprising content written for a visual web browser responsive to a voice command;

means for identifying one or more highlights on the page;

means for locating content related to the one or more highlights on the page;

means for transmitting, via the voice link, a voice response corresponding to an aural recitation of the one or more highlights;

means for receiving, via the voice link, a voice selection indicating selection of one of the one or more highlights responsive to the voice response;

means for locating additional content written for the visual web browser responsive to the selected one of the one more or more highlights;

means for determining a content density associated with the additional content;

means for determining multiple related content responsive to the content density;
means for identifying one or more paragraphs associated with one or more subgroups of the multiple related content responsive to the content density;
means for generating summaries of the one or more paragraphs;
means for determining semantic matching between at least two paragraphs; and
means for ordering the related content according to the semantic matching between the at least two paragraphs.

19. An apparatus, comprising:
a transaction processing unit; and
an understanding unit configured to operate together with the transaction processing unit to:
   establish a voice link with an access provider and locate a page comprising content written for a visual web browser responsive to a voice command;
   identify one or more highlights on the page and locate content related to the one or more highlights on the page;
   transmit, via the voice link, a voice response corresponding to an aural recitation of the one or more highlights;
   receive, via the voice link, a voice selection indicating selection of one of the one or more highlights responsive to the voice response;
   locate additional content written for the visual web browser responsive to the selected one of the one more or more highlights;
   determine a content density associated with the additional content;
   determine multiple related content responsive to the content density;
   identify one or more paragraphs associated with one or more subgroups of the multiple related content responsive to the content density;
   generate summaries of the one or more paragraphs;
   determine semantic matching between at least two paragraphs; and
   order the related content according to the semantic matching between the at least two paragraphs.

20. An apparatus, comprising:
a transaction processing unit configured to establish a voice link with an access provider and locate a page comprising content written for a visual web browser responsive to a voice command;
an understanding unit configured to identify one or more highlights on the page and locate content related to the one or more highlights on the page;
where the transaction processing unit is further configured to:
   transmit, via the voice link, a voice response corresponding to an aural recitation of the one or more highlights;
   receive, via the voice link, a voice selection indicating selection of one of the one or more highlights responsive to the voice response; and
   locate additional content written for the visual web browser responsive to the selected one of the one more or more highlights; and where the understanding unit is further configured to:
   determine a content density associated with the additional content;
   determine multiple related content responsive to the content density;
   identify one or more paragraphs associated with one or more subgroups of the multiple related content responsive to the content density;
   generate summaries of the one or more paragraphs;
   determine semantic matching between at least two paragraphs; and
   order the related content according to the semantic matching between the at least two paragraphs.

21. A method, comprising:
establishing a voice link with an access provider;
issuing a voice command to locate a page comprising content written for a visual web browser responsive to a voice command;
receiving a voice response, via the voice link, corresponding to an aural recitation of one or more highlights identified on the page;
issuing a voice selection indicating selection of the one or more highlights responsive to the voice response;
receiving an aural recitation of an ordered list of at least two subgroups of multiple related content according to corresponding weighted scores;
wherein additional content written for the visual web browser is located responsive to the selected one or more highlights;
wherein the multiple related content is determined responsive to a content density associated with the additional content;
wherein the at least two subgroups have a semantic matching determined responsive to the content density; and
wherein the weighted scores are assigned to the at least two subgroups according to the semantic matching.

22. A method, comprising:
establishing a voice link with an access provider;
issuing a voice command to locate a page comprising content written for a visual web browser responsive to a voice command;
receiving a voice response, via the voice link, corresponding to an aural recitation of one or more highlights identified on the page;
issuing a voice selection indicating selection of the one or more highlights responsive to the voice response;
receiving an aural recitation of an ordered list of at least two paragraphs in multiple related content according to corresponding weighted scores;
wherein additional content written for the visual web browser is located responsive to the selected one or more highlights;
wherein the multiple related content is determined responsive to a content density associated with the additional content;
wherein the at least two paragraphs are identified in the multiple related content;
wherein the at least two paragraphs have a semantic matching determined responsive to the content density; and
wherein the weighted scores are assigned to the at least two paragraphs according to the semantic matching.

* * * * *

UNITED STATES PATENT AND TRADEMARK OFFICE
CERTIFICATE OF CORRECTION

| | | |
|---|---|---|
| PATENT NO. | : 7,873,900 B2 | Page 1 of 1 |
| APPLICATION NO. | : 11/223281 | |
| DATED | : January 18, 2011 | |
| INVENTOR(S) | : Khan | |

It is certified that error appears in the above-identified patent and that said Letters Patent is hereby corrected as shown below:

Column 17, line 52, in Claim 16, after "audio" delete "a".

Column 18, line 37, in Claim 17, delete "more or more" and insert -- or more --.

Column 18, line 65, in Claim 18, delete "more or more" and insert -- or more --.

Column 19, lines 30-31, in Claim 19, delete "more or more" and insert -- or more --.

Column 19, lines 61-62, in Claim 20, delete "more or more" and insert -- or more --.

Signed and Sealed this
Seventeenth Day of May, 2011

David J. Kappos
*Director of the United States Patent and Trademark Office*